US009254820B2

(12) United States Patent
Geubel et al.

(10) Patent No.: US 9,254,820 B2

(45) Date of Patent: Feb. 9, 2016

(54) WIPER DRIVE

(75) Inventors: Paul Geubel, Baden-Baden (DE); Orlando Sterns, Karlsruhe (DE); Paul Seiert, Miskolc (DE)

(73) Assignee: Robert Bosch GmbH, Stuttgart (DE)

( * ) Notice: Subject to any disclaimer, the term of this patent is extended or adjusted under 35 U.S.C. 154(b) by 260 days.

(21) Appl. No.: 13/991,365

(22) PCT Filed: Oct. 25, 2011

(86) PCT No.: PCT/EP2011/068631

§ 371 (c)(1), (2), (4) Date: Jun. 3, 2013

(87) PCT Pub. No.: WO2012/072340

PCT Pub. Date: Jun. 7, 2012

(65) Prior Publication Data

US 2013/0247323 A1 Sep. 26, 2013

(30) Foreign Application Priority Data

Dec. 1, 2010 (DE) ........................ 10 2010 062 236

(51) Int. Cl.
*B60S 1/58* (2006.01)
*B60S 1/34* (2006.01)

(52) U.S. Cl.
CPC ................ *B60S 1/58* (2013.01); *B60S 1/3493* (2013.01); *B60S 1/583* (2013.01); *B60S 1/349* (2013.01)

(58) Field of Classification Search
CPC ...... B60S 1/349; B60S 1/3493; B60S 1/3495; B65D 45/22; B65D 45/20; B65D 45/18; B65D 45/16
USPC .............. 15/250.31, 250.3, 250.29; 220/326, 220/324, 315, 784–788; 215/280, 273
See application file for complete search history.

(56) References Cited

U.S. PATENT DOCUMENTS 3,759,415 A * 9/1973 Cloyd .......................... 220/784
3,811,597 A * 5/1974 Frankenberg et al. ........ 220/284
(Continued)

FOREIGN PATENT DOCUMENTS

DE 19546906 A1 * 6/1997 ................ B60S 1/34
DE 102006011418 9/2007
(Continued)

OTHER PUBLICATIONS

International Search Report for Application No. PCT/EP2011/068631 dated Dec. 30, 2011 (2 pages).

*Primary Examiner* — Monica Carter
*Assistant Examiner* — Andrew A Horton
(74) *Attorney, Agent, or Firm* — Michael Best & Friedrich LLP

(57) ABSTRACT

The invention relates to a wiper drive for a rear window wiper of a motor vehicle, comprising a drive unit having a wiper shaft for the oscillating pivoting about a rotational axis, and having a protective cap surrounding the wiper shaft in an axial section, wherein the protective cap is connected to a housing of the drive unit by way of a radial press fit connection. The protective cap comprises a detent element engaging in a recess in the housing in order to absorb axial forces on the protective cap.

26 Claims, 6 Drawing Sheets

130
125
135
120
110
115
140
145
100
145
140
105

(56) References Cited

U.S. PATENT DOCUMENTS

| | | | | | |
|---|---|---|---|---|---|
| 3,840,152 | A | * | 10/1974 | Hodge | 220/783 |
| 4,431,113 | A | * | 2/1984 | Sims, Jr. | 220/784 |
| 5,979,691 | A | * | 11/1999 | Von Holdt | 220/266 |
| 2006/0242782 | A1 | * | 11/2006 | Weiler et al. | 15/250.31 |
| 2008/0264946 | A1 | * | 10/2008 | Moschella et al. | 220/326 |
| 2009/0025171 | A1 | * | 1/2009 | Cerdan et al. | 15/250.31 |
| 2009/0094774 | A1 | * | 4/2009 | Reith et al. | 15/250.31 |

FOREIGN PATENT DOCUMENTS

| | | | | | |
|---|---|---|---|---|---|
| DE | 102006062588 | | | 7/2008 | |
| EP | 1837256 | | | 9/2007 | |
| EP | 1837979 | A2 | * | 9/2007 | H02K 7/116 |
| JP | H07251715 | | | 10/1995 | |
| WO | WO 2004028874 | A1 | * | 4/2004 | B60R 21/34 |
| WO | WO 2006076947 | A1 | * | 7/2006 | B60S 1/04 |
| WO | WO 2010015510 | | * | 2/2010 | B60S 1/04 |

* cited by examiner 115
230
225
220
125
130
215
210
135
205

WIPER DRIVE

BACKGROUND OF THE INVENTION

The invention relates to a wiper drive for a rear window wiper of a motor vehicle.

A wiper drive is an encapsulated drive unit for the oscillating pivoting movement of a wiper arm about an axis of rotation in order to guide a wiper blade connected to the wiper arm between two turning positions over a windshield and consequently to remove impurities or wet spots from said windshield. The wiper drive can be used in particular on a rear window wiper of a motor vehicle. Here, the wiper shaft is usually protected by means of a protective cap against penetrating moisture and foreign bodies. The protective cap is connected by means of a radial press connection to a cylindrical formation of a housing of the wiper drive, with the wiper shaft extending through the formation. The relatively hard protective cap is in turn surrounded by a soft rubber bush in the region of a lead-through through a vehicle body or through the windshield of the motor vehicle. The wiper drive is connected at elastically mounted suspension points to the body of the motor vehicle in order to provide insulation with respect to structure-borne noise and vibrations.

During the wiping operation, the wiper drive moves relative to the body of the motor vehicle owing to the wiper forces which occur. As a result of this movement, owing to a so-called pumping action, axial forces are exerted on the protective cap which attempt to free the protective cap from its press connection with the housing of the wiper drive and pull it off in the upward direction. Further axial forces can occur when an impulse acts in the axial direction on the wiper drive or the wiper arm, for example when banging closed a tailgate of the motor vehicle on which the wiper drive is fastened.

SUMMARY OF THE INVENTION

The object on which the invention is based is to provide an improved wiper drive which is better protected against axial loads in the region of a lead-through through the body of the motor vehicle.

A wiper drive according to the invention for a rear window wiper of a motor vehicle comprises a drive unit having a wiper shaft for pivoting in an oscillating manner about an axis of rotation and a protective cap which surrounds the wiper shaft over an axial portion, wherein the protective cap is connected by means of a radial press connection to a housing of the drive unit. The protective cap comprises a latching element which engages in a cutout in the housing in order to absorb axial forces on the protective cap. The cutout preferably extends in the housing in a direction which is radial with respect to the axis of rotation.

According to the invention, the known press connection between the protective cap and the housing only remains stressed to a small extent if at all in the axial direction. The strength of the connection between the protective cap and the housing can consequently also be maintained after long-time or intensive use of the wiper drive. Moreover, by virtue of the axial fixing of the protective cap by means of the latching element, a relative movement between the wiper shaft and the protective cap can be minimized. As a result, the wear behavior of a seal between the protective cap and the wiper shaft can be improved.

In a preferred embodiment, the latching element is designed, after engaging in the cutout, to exert an axial prestress on the protective cap. As a result, the connection between the protective cap and the housing can be further secured.

The latching element can have a hook portion with an axial and a radial bearing surface in each case for bearing against a corresponding bearing surface in the region of the cutout of the housing. Here, an angle between the axial and the radial bearing surface of the hook portion can be 90° or less. If the angle is less than 90°, an axial force which attempts to remove the protective cap from its press connection with the housing can be used to further strengthen an engagement between the hook portion and the housing such that the protective cap cannot be released even when the axial forces acting on it are large enough to release the press connection to the housing.

The latching element can comprise an elastically deformable spring portion, wherein the spring portion comprises two webs which are separated from one another. The webs can extend next to one another from a cylindrical portion of the protective cap in a radial and/or axial direction with respect to the hook portion described. The provision of at least two webs which are separated from one another makes it possible for the protective cap to be maintained fixed in the axial direction even if one of the webs should tear, break or diminish in its spring force. Moreover, improved accessibility to the hook elements can be provided in the region between the webs, such that a tool can be applied at this point in order to remove the latching element from the cutout in the housing and to withdraw the protective cap.

The spring portion can comprise a first, radial portion and a second, axial portion. As a result of the L-shaped spring portion, it is possible for spring properties to be predeterminable in an advantageous manner by correspondingly dimensioning individual portions of the spring portion.

The protective cap can comprise a torque support with a bearing surface, which extends in the circumferential direction of the protective cap, for bearing against a corresponding bearing surface of the housing.

Consequently, a correct rotational orientation of the protective cap can be imposed during assembly on the housing. The latching element can thus be improved in its holding reliability. Moreover, the torque support can contribute to absorbing rotational forces, with the result that the press connection of the protective cap with the housing can be further relieved of stress.

In one embodiment, the protective cap is formed in one piece with the latching element. As a result, assembly can be simplified and manufacturing costs can be reduced. Additional parts to achieve the effect according to the invention are not required.

BRIEF DESCRIPTION OF THE DRAWINGS

It is also possible to provide a plurality of latching elements which are arranged in different radial directions on the protective cap. Angles between the latching elements or between one of the latching elements and the torque support can be identical. The latching elements and the torque support can thus be distributed uniformly over the circumference of the protective cap. As a result, forces can be more uniformly transferred between the protective cap and the housing such that the durability of the protective cap and, in particular, of its latching elements can be improved. The invention will now be described more precisely with reference to the appended figures, in which.

DETAILED DESCRIPTION

Figure 1:
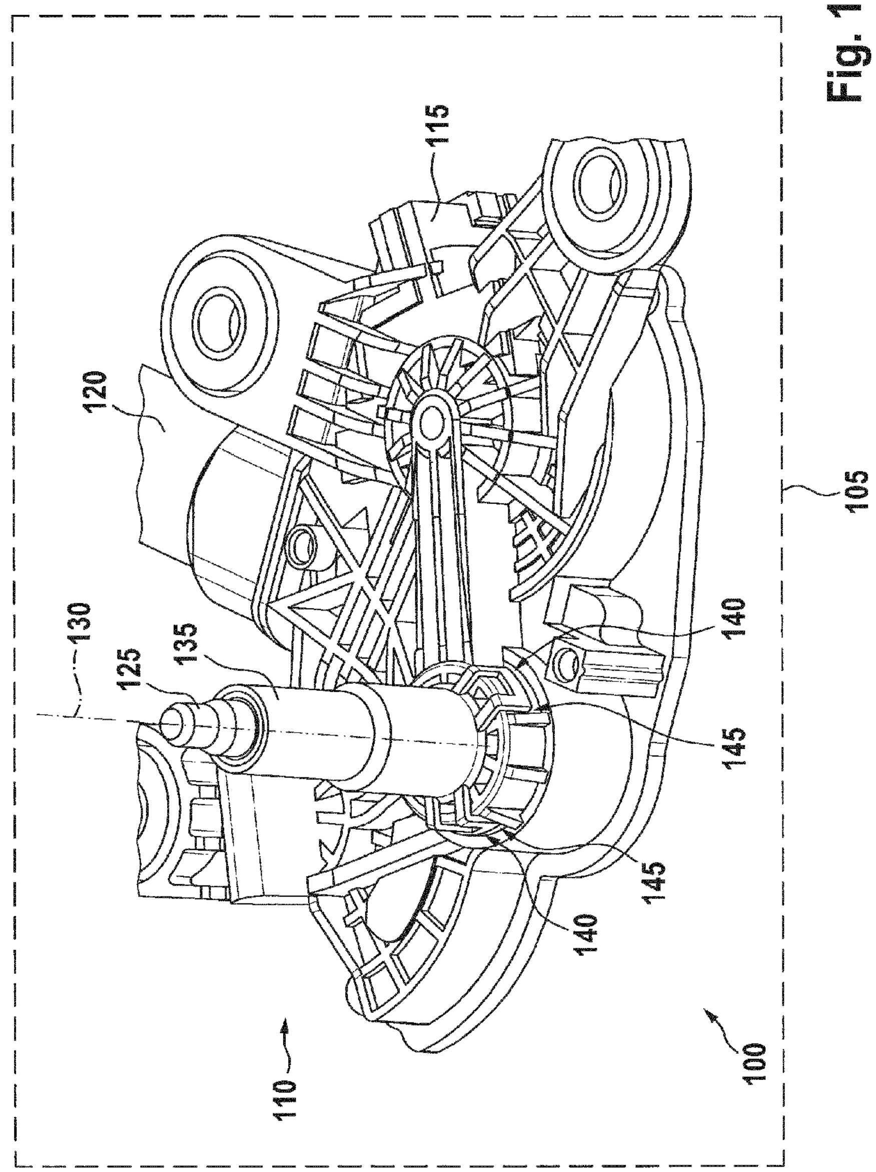
FIG. 1 shows a wiper drive for a rear window wiper of a motor vehicle.

FIG. 1 shows a wiper drive 100 for a rear window wiper of a motor vehicle 105. The wiper drive 100 comprises a drive unit 110 with a housing 115 on which a drive motor 120 is mounted. A drive shaft 125 projects from the housing 115 in a vertical direction. What cannot be seen is a gear mechanism of the drive unit 110 which is accommodated in the housing 115 and transmits a movement of the electric motor 120 to the drive shaft 125. The drive unit 110 is configured such that or is activated in such a way that the drive shaft 125 is rotated in an oscillating manner about an axis of rotation 130. The drive shaft 125 has an upper shaft end which is configured for the torque-locking fastening of a wiper arm.

A lower axial portion of the drive shaft 125 is surrounded by a protective cap 135 which at a lower end comprises two latching elements 140 which engage in the radial direction in corresponding cutouts 145 in the housing which extend transversely with respect to the axis of rotation 130.

The protective cap 135 has a lower portion from which the latching elements 140 extend, and an upper portion which has a smaller outside diameter than the lower portion. The two portions are substantially cylindrical.

Figure 2:
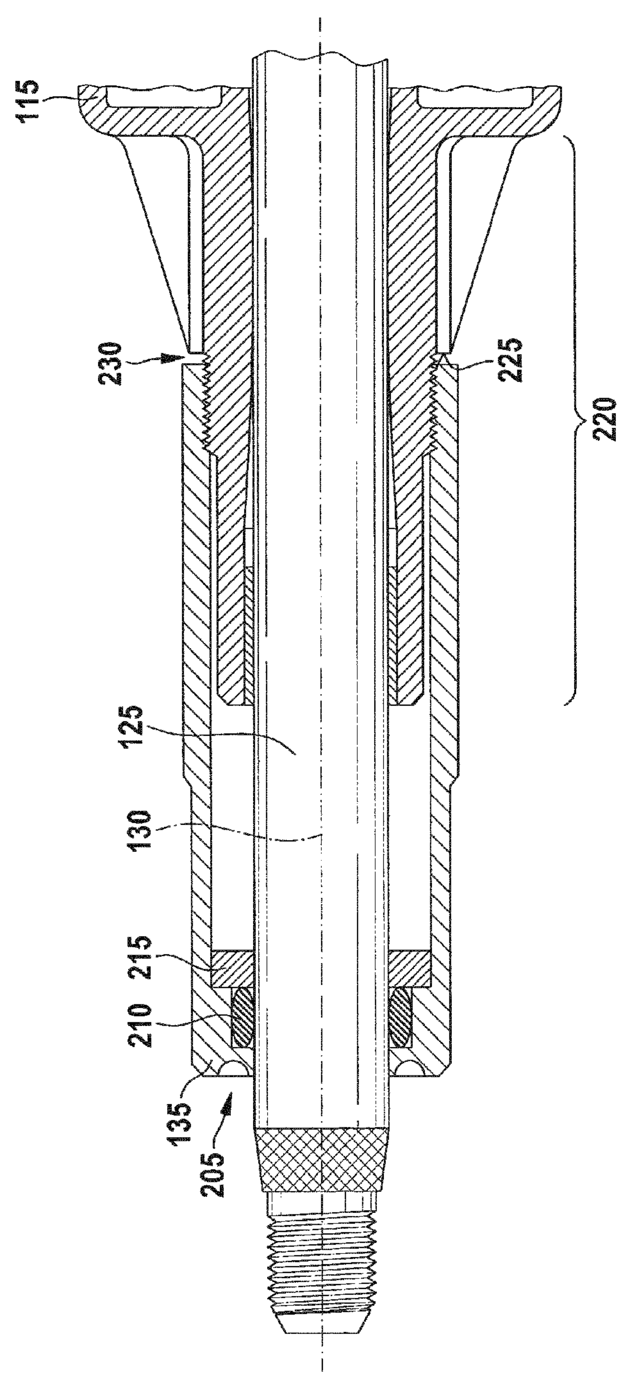
FIG. 2 shows a sectional view through the wiper drive from FIG. 1.

FIG. 2 shows a sectional view through the wiper drive 100 from FIG. 1. There is represented a detail which comprises a region around the protective cap 135. The latching elements 140 are not represented in FIG. 2.

The protective cap 135 has, in the region of its left end, a sealing lip 205 which is peripherally in contact with the drive shaft 125 in order to prevent moisture and/or impurities from penetrating a region within the protective cap 135. For the same purpose, an O-ring 210 is situated on an inner side of the protective cap 135 in the region of the sealing lip 205. The O-ring 210 is held in the axial direction to the left by the sealing lip 205 and in the axial direction to the right by a retaining ring 215. The retaining ring 215 can be pressed with elastic stress into the interior of the protective cap 135 or fixedly mounted there by means of ultrasonic welding.

The protective cap 135 is preferably made of plastic, in particular a relatively hard plastic such as, for example, PA66.

In the region of a right end, the protective cap 135 is conically formed on its inner side. The housing 115 has an approximately tubular extension 220 which extends coaxially to the drive shaft 125 and the protective cap 135. The extension 220 is likewise conical on its outer side, with the result that a press fit can be produced between the protective cap 135 and the extension 220 by the protective cap 135 in the illustration of FIG. 2 being pushed with a predetermined axial force to the right onto the extension 220.

There is an axial gap 230 in the region between a right axial end of the protective cap 135 and a shoulder 225 of the extension 220. In an embodiment of the protective cap 135 having at least one latching element 140, it is advantageous to reduce the axial gap 230 to 0, in order to prevent the protective cap 135 being moved as a result of operation, shaking or vibration in such a way that the press fit between the protective cap 135 and the extension 220 is released.

Figure 3B:
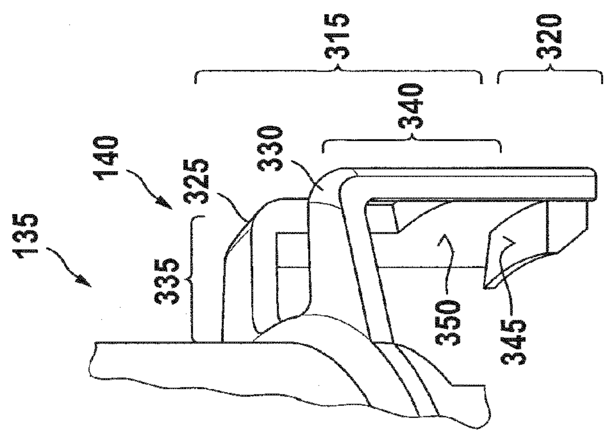
FIG. 3 shows a protective cap for the wiper drive from FIG. 1.
Figure 3A:
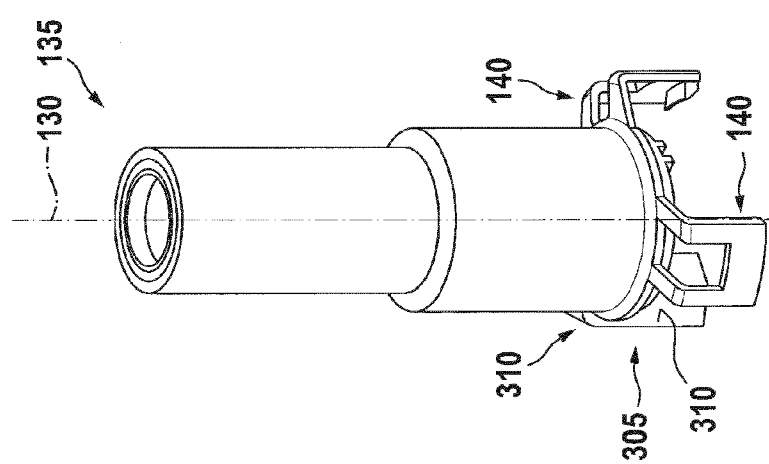

FIG. 3 shows a protective cap 135 having two latching elements 140 for the wiper drive 100 from FIG. 1. Here, FIG. 3*a* shows a complete view of the protective cap 135 and FIG. 3*b* shows an enlargement of a portion of the protective cap 135 with one of the latching elements 140.

The two latching elements 140 enclose an angle of about 120° with respect to the axis of rotation 130. A torque support 305 is situated offset at angles of about 120° with respect to the latching elements 140. The torque support 305 is substantially formed by an axial extension having two bearing surfaces 310 which are situated substantially opposite one another in the circumferential direction of the torque support 305 around the axis of rotation 130. The bearing surfaces 310 preferably extend in radial planes with respect to the axis of rotation 130.

The latching element 140 comprises a spring portion 315 and a hook portion 320. The spring portion 315 connects a lower end of a cylindrical portion of the protective cap 135 to the hook portion 320 and is formed by a first web 325 and a second web 330 which extend substantially parallel to one another. Each web 325, 330 comprises a first, radial portion 335 and a second, axial portion 340. The radial portion 335 extends substantially perpendicularly to the axis of rotation 130 and forms an angle of about 90° with the axial portion 340.

The hook portion 320 comprises an axial bearing surface 345 which points upwardly, and a radial bearing surface 350 which points inwardly with respect to the axis of rotation 130. In other embodiments of the invention, the radial bearing surface 350 may also point outwardly in the radial direction. The bearing surfaces 345 and 350 enclose an angle with one another which is at most 90°, but preferably slightly less, for example about 85° or about 80°.

Figure 4A:
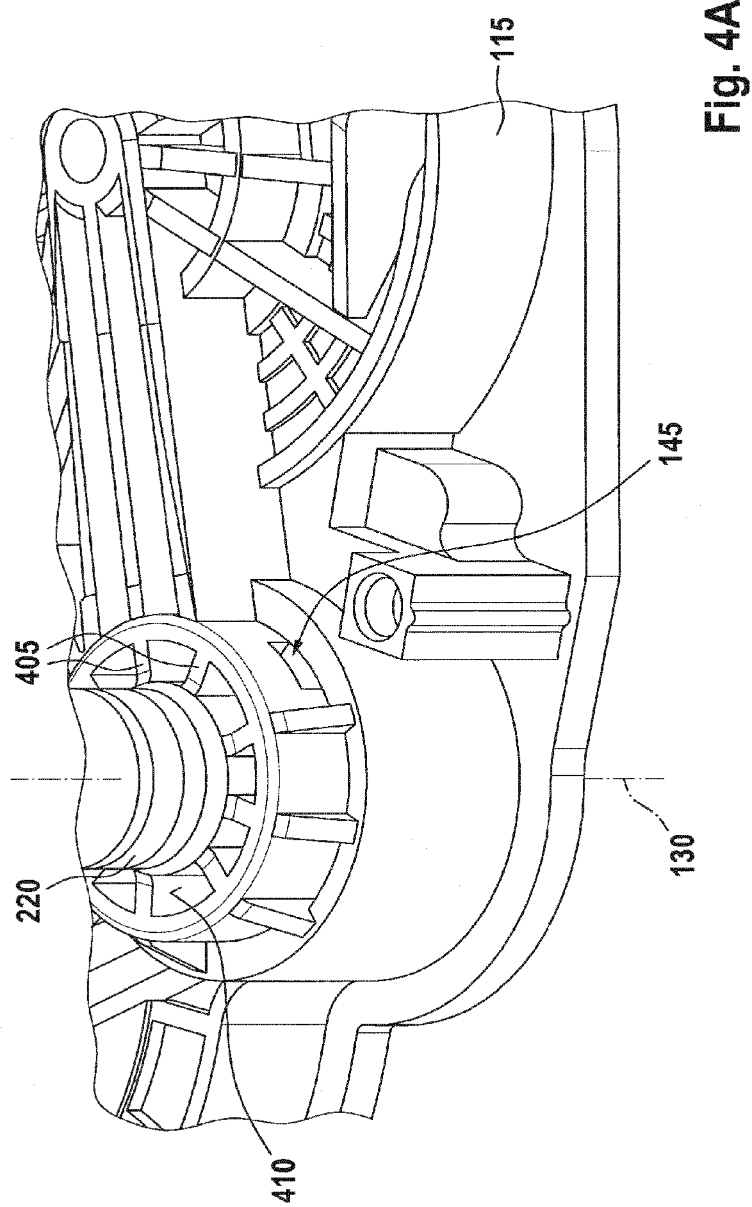
FIG. 4 shows detail views of a housing of the wiper drive from FIG. 1.
Figure 4B:
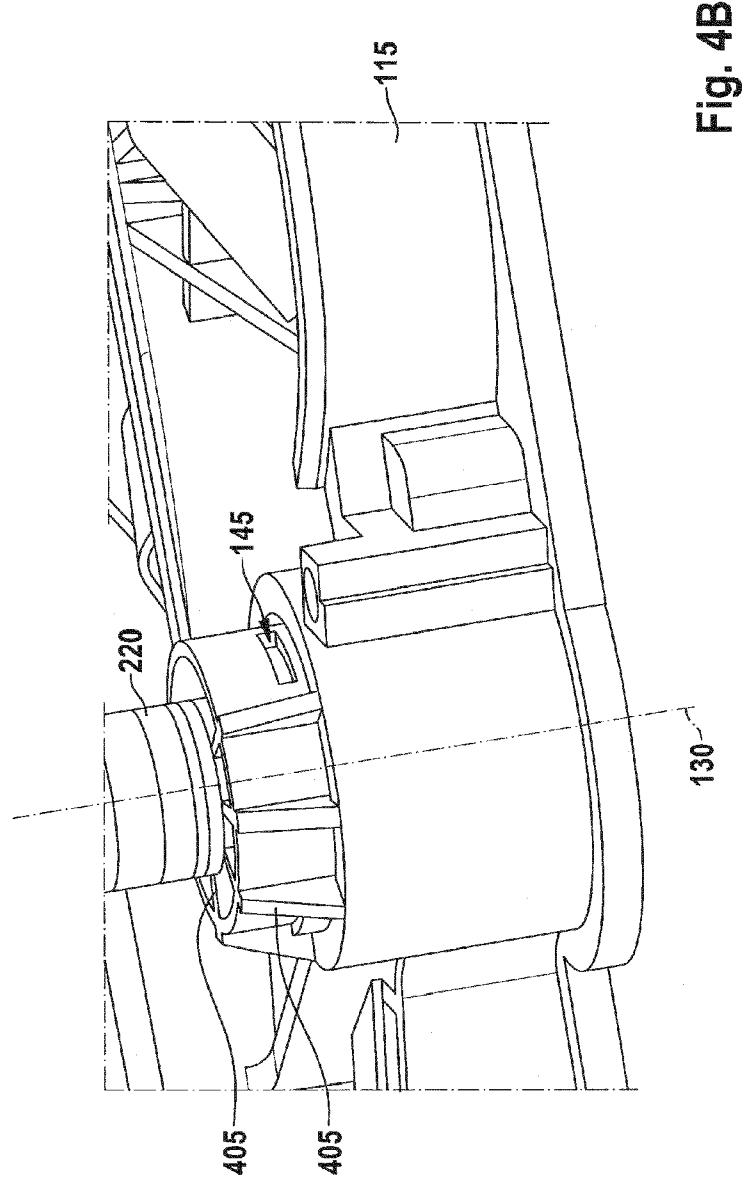

FIG. 4 shows detailed views of a housing 115 of the wiper drive 100 from FIG. 1. In FIGS. 4*a* and 4*b*, the housing 115 can be seen from different perspectives.

The extension 220 is supported by means of a number of radial webs 405 with respect to the remainder of the housing 115. Two adjacent webs 405 form a cutout for receiving the torque support 305 of the protective cap 135. Bearing surfaces 410 of the webs 405 that extend perpendicularly to the circumferential direction are designed to bear against the bearing surfaces 310 of the torque support 305.

The webs 405 are connected to one another by means of an annular reinforcement 415 extending around the axis of rotation 130. On a radial outer side, the cutout 145 is made in the radial direction in the reinforcement 415 in the region between two webs 405. The cutout 145 forms an undercut on the housing 115.

Figure 5A:
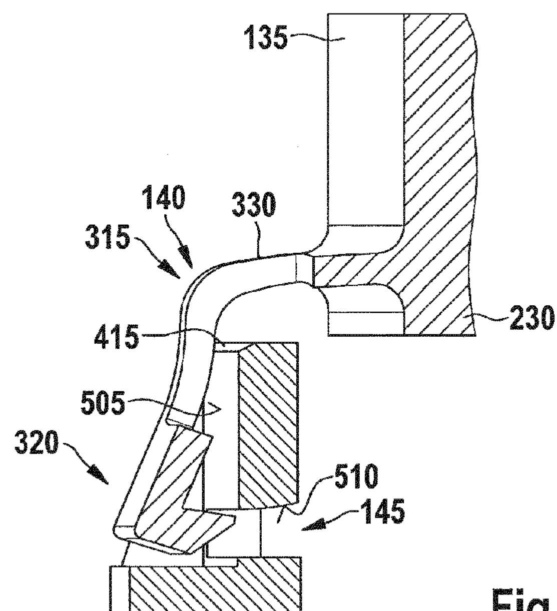
FIG. 5 shows a sectional view through the wiper drive from FIG. 1 during assembly of the protective cap.
Figure 5B:
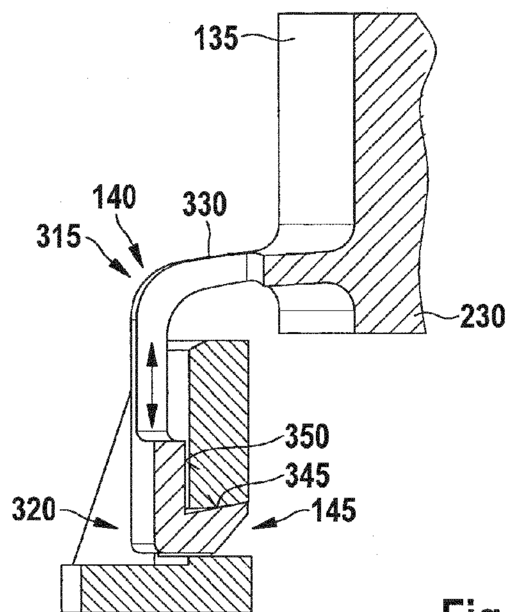

FIG. 5 shows a sectional view through the wiper drive 100 from FIG. 1 while assembling the protective cap 135. The region illustrated is limited to an area surrounding one of the latching elements 140. To clarify the illustration, the first web 325 of the spring portion 315 of the latching element 140 is not illustrated. FIG. 5*a* shows the protective cap 135 in a position in which the hook portion 320 of the latching element 140 is not yet completely latched into the cutout 145, while in the illustration of FIG. 5*b* the hook portion 320 is completely latched in.

In the position of the protective cap 135 shown in FIG. 5*b*, an outer boundary surface 505 of the reinforcement 415 is in contact with the radial bearing surface 350 of the hook portion 320 of the latching element 140. An upper (in the axial direction) boundary surface 510 of the cutouts 145 which extends through the reinforcement 415 bears simultaneously against the axial bearing surface 345 of the hook portion 320 of the latching element 140.

The latching element 140 is preferably dimensioned in such a way that the spring portion 315 of the latching element 140 exerts a downwardly directed prestress on the protective cap 135 when the axial gap 230 is zero and the hook portion 320 is completely latched in, as is illustrated in FIG. 5*b*. The prestressing is mainly maintained by the radial portion 335 of the web 330. The press connection represented in FIG. 2 between the extension 220 of the housing 115 and an end of the protective cap 135 corresponding thereto can consequently be reduced or even completely liberated in its loading by axial forces such that a releasing of the press connection in the operation of the wiper drive 100 is less probable or can be prevented.

What is claimed is:

1. A wiper drive (100) for a rear window wiper of a motor vehicle (105), comprising:

a drive unit (110) having a wiper shaft (125) for pivoting in an oscillating manner about an axis of rotation (130);

a protective cap (135) which surrounds the wiper shaft (125) over an axial portion;

wherein the protective cap (135) is connected by means of a radial press connection to a housing (115) of the drive unit (110), characterized in that the protective cap (135) comprises a latching element (140) which engages in a cutout (145) in the housing (115) in order to absorb axial forces on the protective cap (135), wherein the latching element (140) has a hook portion (320) with an axial (345) and a radial (350) bearing surface in each case for bearing against a corresponding bearing surface (510, 505) in a region of the cutout (145) of the housing (115), and an angle between the axial (345) and the radial (350) bearing surface of the hook portion (320) is less than 90°, wherein a plurality of latching elements (140) are provided at different radial angles on the protective cap (135), each of the latching elements (140) including a hook portion (320), wherein the housing (115) includes a plurality of cutouts (145) to receive segments of the hook portions (320), wherein each of the hook portions (320) includes an axial (345) and a radial (350) bearing surface in each case for bearing against a corresponding bearing surface (505, 510) in a region of one of the cutouts (145) of the housing (115), and an angle between the axial (345) and the radial (350) bearing surface of each of the hook portions (320) is less than 90°, wherein the housing (115) includes an outer boundary surface (505) that is a portion of a cylinder, and wherein the radial bearing surfaces (350) are also each a portion of a cylinder and extend parallel to the axis of rotation.

2. The wiper drive (100) as claimed in claim 1, characterized in that each latching element (140) is configured, after engaging in one of the cutouts (145), to exert an axial prestress on the protective cap (135).

3. The wiper drive (100) as claimed in claim 1, characterized in that each latching element (140) comprises an elastically deformable spring portion (315), wherein the spring portion (315) comprises two webs (325, 330) which are separated from one another.

4. The wiper drive (100) as claimed in claim 1, characterized in that each latching element (140) comprises an elastically deformable spring portion (315), wherein the spring portion (315) comprises a first, radial portion (335) and a second, axial portion (340).

5. The wiper drive (100) as claimed in claim 1, characterized in that the protective cap (135) comprises a torque support (305) with a bearing surface (310), which extends in a circumferential direction of the protective cap (135), for bearing against a corresponding bearing surface (410) of the housing (115).

6. The wiper drive (100) as claimed in claim 5, characterized in that the latching elements (140) and the torque support (305) are distributed uniformly over the circumference of the protective cap (135).

7. The wiper drive (100) as claimed in claim 1, characterized in that the protective cap (135) is formed in one piece with the latching elements (140).

8. The wiper drive (100) as claimed in claim 1, wherein the protective cap (135) is configured to be coupled to the housing (115) by pressing the protective cap (135) axially along the axis of rotation (130) in a first direction, and wherein the axial bearing surfaces (345) extend from the radial bearing surfaces (350) in directions both radially inwardly toward the axis of rotation (115) and opposite the first direction.

9. The wiper drive (100) as claimed in claim 1, wherein the axial bearing surfaces (345) and the radial bearing surfaces (350) converge together to form hooks.

10. The wiper drive (100) as claimed in claim 1, wherein the radial bearing surfaces (350) of the hook portions (320) are pressed against radial bearing surfaces (505) that are adjacent the cutouts (145).

11. The wiper drive (100) as claimed in claim 1, wherein the axial bearing surfaces (345) of the hook portions (320) are pressed against axial bearing surfaces (510) that form part of the cutouts (145).

12. A wiper drive (100) for a rear window wiper of a motor vehicle (105), comprising:

a drive unit (110) having a wiper shaft (125) for pivoting in an oscillating manner about an axis of rotation (130);

a protective cap (135) which surrounds the wiper shaft (125) over an axial portion;

wherein the protective cap (135) is connected by means of a radial press connection to a housing (115) of the drive unit (110), characterized in that the protective cap (135) comprises a latching element (140) which engages in a cutout (145) in the housing (115) in order to absorb axial forces on the protective cap (135), wherein the latching element (140) has a hook portion (320) with an axial (345) and a radial (350) bearing surface in each case for bearing against a corresponding bearing surface (510, 505) in a region of the cutout (145) of the housing (115), and an angle between the axial (345) and the radial (350) bearing surface of the hook portion (320) is less than 90°, wherein the housing (115) includes an outer boundary surface (505) that is a portion of a cylinder, and wherein the radial bearing surface (350) is also a portion of a cylinder and extends parallel to the axis of rotation.

13. The wiper drive (100) as claimed in claim 12, wherein the protective cap (135) is configured to be coupled to the housing (115) by pressing the protective cap (135) axially along the axis of rotation (130) in a first direction, and wherein the axial bearing surface (345) extends from the radial bearing surface (350) in a direction both radially inwardly toward the axis of rotation (115) and in a direction that is opposite the first direction.

14. The wiper drive (100) as claimed in claim 12, wherein the axial bearing surface (345) and the radial bearing surface (350) converge together to form a hook.

15. The wiper drive (100) as claimed in claim 12, wherein the radial bearing surface (350) of the hook portion (320) is pressed against a radial bearing surface (505) that is adjacent the cutout (145).

16. The wiper drive (100) as claimed in claim 12, wherein the axial bearing surface (345) of the hook portion (320) is pressed against an axial bearing surface (510) that forms part of the cutout (145).

17. The wiper drive (100) as claimed in claim 12, characterized in that the latching element (140) is configured, after engaging in the cutout (145), to exert an axial prestress on the protective cap (135).

18. The wiper drive (100) as claimed in claim 12, characterized in that the latching element (140) comprises an elastically deformable spring portion (315), wherein the spring portion (315) comprises two webs (325, 330) which are separated from one another.

19. The wiper drive (100) as claimed in claim 12, characterized in that the latching element (140) comprises an elastically deformable spring portion (315), wherein the spring portion (315) comprises a first, radial portion (335) and a second, axial portion (340).

20. The wiper drive (100) as claimed in claim 12, characterized in that the protective cap (135) comprises a torque support (305) with a bearing surface (310), which extends in a circumferential direction of the protective cap (135), for bearing against a corresponding bearing surface (410) of the housing (115).

21. The wiper drive (100) as claimed in claim 12, characterized in that the protective cap (135) is formed in one piece with the latching element (140).

22. The wiper drive (100) as claimed in claim 12, wherein a plurality of latching elements (140) are provided at different radial angles on the protective cap (135), each of the latching elements (140) including a hook portion (320), and wherein the housing (115) includes a plurality of cutouts (145) to receive segments of the hook portions (320).

23. A wiper drive (100) for a rear window wiper of a motor vehicle (105), comprising:

a drive unit (110) having a wiper shaft (125) for pivoting in an oscillating manner about an axis of rotation (130);

a protective cap (135) which surrounds the wiper shaft (125) over an axial portion;

wherein the protective cap (135) is connected by means of a radial press connection to a housing (115) of the drive unit (110), characterized in that the protective cap (135) comprises a latching element (140) which engages in a cutout (145) in the housing (115) in order to absorb axial forces on the protective cap (135), wherein the latching element (140) has a hook portion (320) with an axial (345) and a radial (350) bearing surface in each case for bearing against a corresponding bearing surface (510, 505) in a region of the cutout (145) of the housing (115), and an angle between the axial (345) and the radial (350) bearing surface of the hook portion (320) is less than 90°, wherein the housing (115) includes an outer boundary surface (505) and the cutout (145) is in the outer boundary surface (350), wherein the cutout (145) is defined in part by an upper boundary surface (510), a first portion of the upper boundary surface (510) extending at a non-zero angle relative to a plane that is perpendicular to the axis of rotation, and wherein the axial bearing surface (345) is configured to engage the first portion of the upper boundary surface (510).

24. The wiper drive (100) as claimed in claim 23, wherein the axial bearing surface (345) extends at the same non-zero angle as the first portion of the upper boundary surface (510).

25. The wiper drive (100) as claimed in claim 23, wherein the upper boundary surface (510) is further defined in part by a second portion that extends along the plane that is perpendicular to the axis of rotation.

26. The wiper drive (100) as claimed in claim 23, wherein the cutout (145) includes a lower boundary surface opposite that of the upper boundary surface (510), wherein the lower boundary surface extends along the plane that is perpendicular to the axis of rotation.

* * * * *